United States Patent [19]

Lillie

[11] 4,302,135
[45] Nov. 24, 1981

[54] ROTARY CUTTING TOOL

[75] Inventor: Charles R. Lillie, Rogers, Ak.

[73] Assignee: TRW Inc., Cleveland, Ohio

[21] Appl. No.: 134,252

[22] Filed: Mar. 26, 1980

[51] Int. Cl.³ .................. B23B 27/10; B23P 15/28
[52] U.S. Cl. ............................... 408/59; 407/11
[58] Field of Search ......................... 408/59; 407/11

[56] References Cited

U.S. PATENT DOCUMENTS

| 1,296,536 | 3/1919 | Leech | 407/11 |
|---|---|---|---|
| 1,940,220 | 12/1933 | McGrath | 408/59 |
| 2,188,631 | 1/1940 | Kraus | 408/59 |
| 2,815,688 | 12/1957 | Forbes et al. | 407/11 |
| 3,037,264 | 6/1962 | Mossberg | 407/11 |
| 3,591,306 | 7/1971 | Kaser | 408/59 |
| 3,816,018 | 6/1974 | Hlocky | 408/59 |
| 4,072,438 | 2/1978 | Powers | 408/59 |

Primary Examiner—Harrison L. Hinson
Attorney, Agent, or Firm—Daniel G. Blackhurst

[57] ABSTRACT

A rotary cutting tool having a cylindrical body with a plurality of flutes and a cutting tool insert mounted at the end of each flute adjacent the body cutting portion end face. The cutting inserts are mounted so that insert first cutting edges are spaced slightly axially outward of the tool body and extend at least generally radially thereof. A coolant flow passage extends coaxially through the body and includes radial branches communicating with the inserts. Preferably, the coolant flow passage is open at the body cutting portion end face and the branches comprise grooved areas in the end face. Each insert includes a coolant flow channel therein extending adjacent to and coextensive with the first cutting edge. An entrance area for these channels communicates with an associated one of the branches. In the preferred arrangement, each insert includes first and second cutting edges with the second cutting edges being slightly spaced radially outward of the cutting tool body. The coolant flow channel in each insert extends adjacent to and coextensive with both cutting edges. A portion of the fluid coolant introduced under pressure into the tool body coolant passage during a material removal operation is directed to and flows along the insert coolant flow channels to provide hydro-static support for workpiece chips for reducing insert wear. The coolant also provides a thermo-shield to reduce overall cutting temperatures.

8 Claims, 5 Drawing Figures

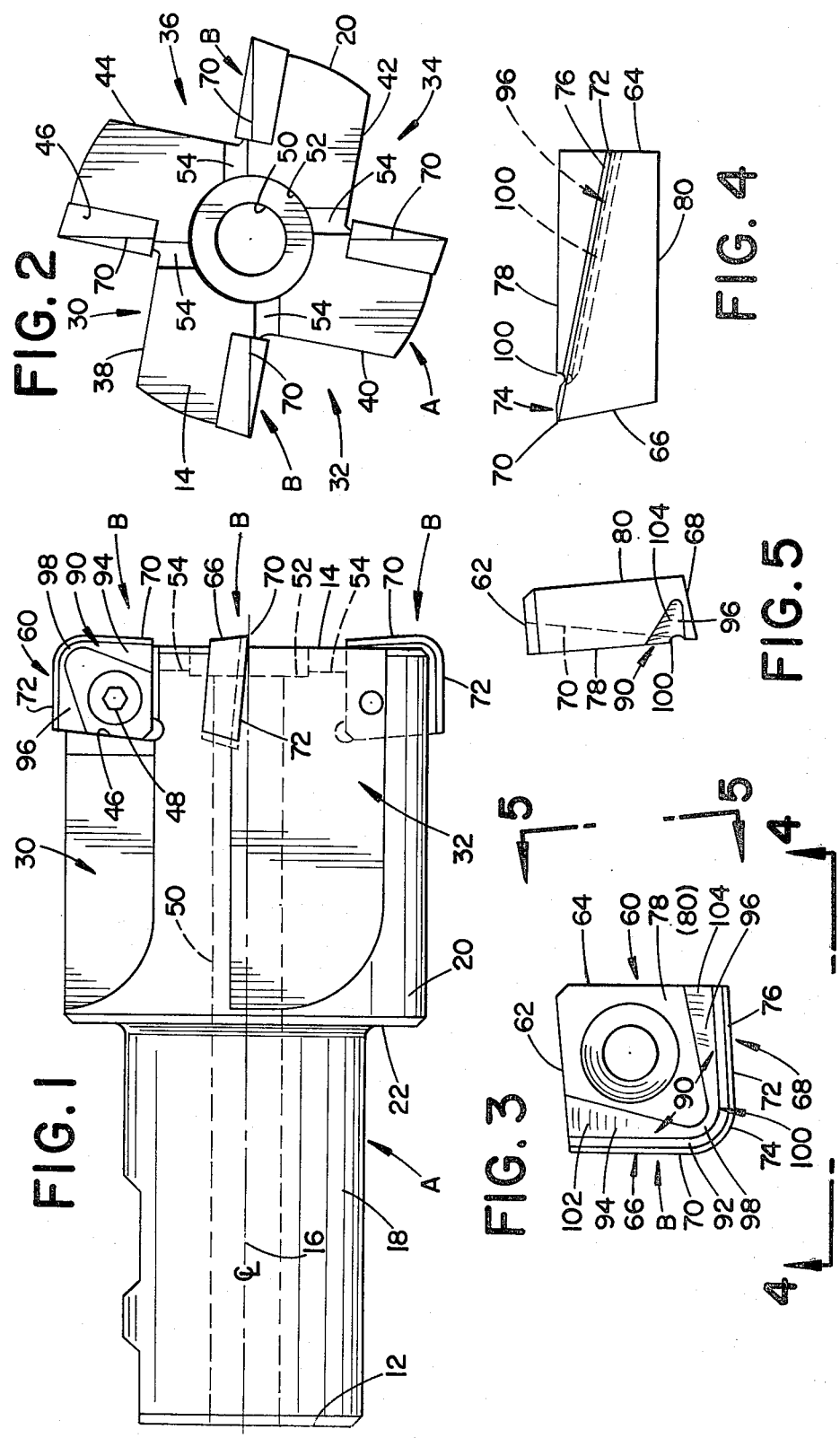

ROTARY CUTTING TOOL

BACKGROUND OF THE INVENTION

The subject invention is directed toward the art of metal cutting tools and, more particularly, to a rotary cutting tool having replaceable cutting inserts.

With the continued improvement of machine designs and cutting tools as well as the development of many new and exotic metals, it is desired to be able to utilize the cutting tools in a manner which allows cutting speeds and feeds to be maximized. While use of cutting inserts formed from carbide and the like have substantially improved material removal results, they exhibit premature wear and elevated cutting temperatures when used for high feed rate machining of so-called high temperature and other exotic alloys. These conditions reduce the effective insert life. There have also been a number of improvements in coolants and the manner of application thereof to a cutting or material removal zone. While these particular improvements have helped somewhat, insert wear and high cutting temperatures remain a significant concern and problem in machining so-called high temperature and other alloys. Means have not heretofore been available to optimize the benefits obtainable from the coolant. Because of these circumstances, frequent tool changes are required necessitating undesired machine down time and increased tool costs to accommodate a machining operation.

The above conditions and factors have made it desirable to develop some means which would allow machining of high temperature or exotic alloys at elevated feeds and/or speeds while reducing cutting insert wear and cutting temperatures. At the same time, however, such an arrangement should permit machining of conventional materials under normal cutting parameters.

The subject invention meets the aforementioned needs and provides a new and improved rotary cutting tool which facilitates improved machining results by reducing cutting tool wear and cutting temperatures. Moreover, the cutting tool is adapted to use in a wide variety of material removal applications.

BRIEF DESCRIPTION OF THE INVENTION

The subject invention provides a new and improved rotary cutting tool which is particularly useful in dynamic type (cutter rotating) material removal applications. One such application is end milling or the like although the invention is readily adapted to many other machining applications and/or environments.

According to the present invention, the tool comprises an elongated, generally cylindrical body having a longitudinal axis extending between first and second terminal body ends. The portion of the body adjacent the first end comprises a shank portion and the portion of the body adjacent the second end comprises a cutting portion. At least one groove extends axially of the body along at least a section of the cutting portion to the body second end and terminates in an insert receiving pocket. A coolant flow passage in the body includes an inlet in the shank portion and an outlet in the cutting portion at the body second end. Also, the flow passage is configured to permit at least some of the coolant passing therethrough to flow toward communication with the insert receiving pocket. A cutting insert disposed in the insert receiving pocket includes a first cutting edge having a length less than the radius of the body second end and extending radially of the body at a location axially outward of the body second end. The first cutting edge extends from an innermost end disposed radially outward of the body longitudinal axis to an outermost end disposed at least slightly beyond the radial outermost area of the body second end. The cutting insert includes a coolant flow channel adjacent to and generally coextensive with the first cutting edge. This flow channel has an entrance end in fluid communication with the body coolant flow passage and an exit end spaced from the entrance end. With this construction, coolant under pressure introduced into the coolant passage inlet during a material removal operation will be directed to the cutting insert flow channel for flow therealong from the entrance end toward the exit end.

In accordance with another aspect of the invention, the cutting insert includes a second cutting edge extending generally parallel to the side wall of the body cutting portion and slightly spaced radially outward therefrom wherein the first and second cutting edges merge with each other at an insert corner. The insert coolant flow channel extends adjacent to and generally coextensive with both the first and second cutting edges. In this case, the flow channel exit end is disposed at the end of the second cutting edge which is remote from the insert corner.

In accordance with another aspect of the invention, the coolant passage includes a main portion coaxial with the body and open at the body second end. The passage further includes a branch portion extending generally radially of the body in fluid communication with the insert receiving pocket. Preferably, this branch comprises a groove in the body second end and the insert coolant channel comprises a groove in the outer face of the insert body.

According to still another aspect of the invention, the body includes a plurality of grooves spaced apart from each other around the body cutting portion. Each groove terminates in an insert receiving pocket having a cutting insert disposed therein with each insert, in turn, having at least a first cutting edge extending radially of the body. The coolant flow passage in the body includes a main portion and branches extending therefrom into communication with the insert receiving pockets of at least some of the plurality of grooves. Those inserts associated with some of the plurality of grooves include coolant flow channels therein. In a preferred arrangement, a coolant flow passage branch communicates with each cutting portion groove and each insert includes a coolant flow channel.

The principal object of the present invention is the provision of a new and improved rotary cutting tool which facilitates more efficient coolant dispersal for reducing tool wear and cutting temperatures.

Another object of the invention is the provision of such a tool which is adapted to a wide variety of material removal applications.

A further object of the present invention is the provision of a new and improved cutting tool which accommodates high feed rate machining of high temperature and/or exotic alloys and will also accommodate more conventional machining parameters for other materials.

Still other objects and advantages for the present invention will become readily apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 is a side elevational view of a rotary cutting tool constructed in accordance with the subject invention;

FIG. 2 is an end view of the cutting tool construction shown in FIG. 1;

FIG. 3 is a plan view of a cutting insert utilized with the overall cutting tool shown in FIG. 1;

FIG. 4 is an end view taken along lines 4—4 of FIG. 3 which is slightly enlarged for ease of illustration; and, FIG. 5 is an end view taken along lines 5—5 of FIG. 3.

DESCRIPTION OF THE PREFERRED EMBDDIMENT

Referring now to the drawings wherein the showings are for purposes of illustrating the preferred embodiment of the invention only and not for purposes of limiting same, FIGS. 1 and 2 show a rotary cutting tool comprised of a cutting tool body A and a plurality of cutting inserts B fixedly secured thereto.

More particularly, cutting tool body A is comprised of a body 10 having opposed ends 12,14 with a body longitudinal axis 16 extending between these ends. The area of the main body adjacent end 12 comprises a mounting end portion 18 and the area adjacent end 14 comprises a cutting end portion 20. Portions 18,20 interface with each other at a radial shoulder 22. Main body 10 has a generally cylindrical configuration and is formed from steel or any other suitable material capable of providing the required strength and rigidity.

Extending axially inward of the body from end 14 along cutting portion 20 are a plurality of recesses or grooves 30,32,34 and 36 which define straight flutes 38,40,42 and 44, respectively. As best shown in FIG. 2, these grooves have a generally V-shaped cross section in a plane perpendicular to body longitudinal axis 16. In addition, flutes 38,40,42 and 44 extend radially into cutting end portion 20 a distance which allows proper cutting action for inserts B as will become apparent hereinafter. However, the flutes should preferably be no larger than necessary to assure sufficient cutting tool rigidity while still allowing sufficient space for proper chip flow.

Disposed at the end of each groove 30,32,34 and 36 adjacent main body end 14 is a somewhat rectangular insert receiving opening or pocket. One such pocket is designated by numeral 46 in FIGS. 1 and 2, it being appreciated that the others are identical thereto unless otherwise noted. Pocket 46 includes a generally planar bottom wall and a pair of generally planar side walls as is known in the art. Cutting inserts B are each retained in association with one of these pockets by convenient and conventional means such as a mechanical fastener 48 received through an opening in the insert body with threaded communication with cutting portion 20 of the tool body.

An elongated coolant passage 50 extends coaxially of main body 10 and has an inlet at body end 12 and an outlet at body end 14. Passage 50 is counterbored as at 52 adjacent body end 14 and radially extending coolant passage branches 54 communicate between passage 50 at counterbore 52 and each of grooves 30,32,34 and 36 at the insert receiving pockets. In the preferred arrangement here under discussion, branches 54 are defined by grooves extending inwardly into body end 14. The purpose of these branches will become more readily apparent hereinafter. It should also be appreciated that other configurations and specific locations for branches 54 may be advantageously utilized without in any way departing from the overall intent or scope of the invention.

FIGS. 3-5 show in some greater detail one of cutting inserts B. It will be appreciated, however, that the other cutting inserts are identical thereto unless otherwise noted. More particularly, insert B is comprised of an insert body generally designated 60 which is constructed from a hard cutting material such as tungsten carbide or the like. The body includes adjacent side walls 62,64 which are closely received by adjacent side walls of the associated insert receiving opening or pocket 46 in the tool body. Adjacent sides 66,68 include first and second cutting edges 70,72 extending therealong with a corner area 74 disposed therebetween. The cutting edges themselves are defined by the intersection of a tapered land area 76 associated with the top or outside face 78 of the insert and the associated one of insert body sides 66,68.

As will be noted from FIGS. 3-5, cutting edge 70 tapers upwardly from insert bottom face 80 toward top face 78 over the cutting edge length from side wall 62 to corner area 74. In like manner, second cutting edge 72 tapers from insert top face 78 toward bottom face 80 over its longitudinal extent from corner area 74 to side wall 64. While the specific taper angle may vary to accommodate different machining circumstances, an angle of approximately 10° is shown in the preferred embodiment. Also, sides 66,68 each taper inwardly into insert body 60 from their associated cutting edge 70,72 toward insert bottom face 80. Although a number of different taper angles may be utilized to accommodate particular machining circumstances, the insert shown has an approximately 10° taper at these areas.

Insert body 60 also includes a coolant flow channel 90 therein. As shown, this channel comprises a groove in top or outside face 78 of the insert body. This groove is disposed closely adjacent to and coextensive with cutting edges 70,72 and is located immediately behind a margin area of surface 92 which intersects land area 76. Flow channel 90 is itself comprised of a portion 94 generally associated with the first cutting edge 70, a portion 96 generally associated with second cutting edge 72 and a third portion 98 generally associated with corner area 74. The flow channel includes an arcuate groove area 100 having the general conformation best shown in FIG. 5 extending over the length thereof between portions 94,96 and 98 thereof.

In the preferred arrangement shown, and merely by way of example, arcuate area 100 generally has a radius of approximately 0.024" at the curved bottom area thereof and a depth of approximately 0.015". These dimensional characteristics may, of course, be varied as deemed necessary and/or appropriate to accommodate a particular rotary cutting environment. Flow channel portions 94 and 96 include curved areas 102,104, respectively, which merge from insert top or outside face 78 into that portion of arcuate area 100 extending therealong. The reason for this is to accommodate the overall spacial relationships between the insert top face and tapered cutting edges 70,72. It should be particularly noted that flow channel 90, i.e., portions 94,96,98 thereof and arcuate area 100 closely follow the contour of cutting edges 70,72 and corner area 74. This relationship is best shown in FIG. 4. This then facilitates ease of coolant supply to the cutting edges in a manner and for reasons to be described hereinafter. Although flow channel 90 is shown as a groove-like area, it is also possible and within the scope of the invention to define the channel by other means or to have other conformations. For example, it would be possible to employ an internal passageway open at the terminal ends of cutting edges 70,72 to define entrance and exit areas therefor.

Referring again to FIGS. 1 and 2, description will hereinafter be made with reference to operation of the subject new rotary cutting tool and the particular advantageous results obtained therefrom. As there shown, the insert receiving pockets in cutting tool body grooves 30,32,34 and 36 are shaped and configured so that the inserts themselves are positioned to facilitate particular cutting characteristics for insert cutting edges 70,72. First cutting edges 70 extend axially outward from both second end 14 and second cutting edges 72 are radially spaced outwardly from cutting portion 20. Also, and with reference to FIG. 2, alternating ones of the inserts have their first cutting edges 70 diametrically aligned across body second end 14. As shown in FIGS. 1 and 2, first cutting edges 70 are each positioned to have negative lead, neutral radial rake and positive axial rake angles. Second cutting edges 72 are each positioned to have neutral radial relief and positive axial rake angle. These relationships may be varied as deemed necessary and/or appropriate to adapt the concepts of the invention to other machining environments or applications.

As shown in FIGS. 1 and 2, it will be noted that radial branches 54 communicate with flow channel 90 of the associated insert. The end of portion 94 adjacent the associated branch acts as a flow channel entrance area and the end of portion 96 spaced remote therefrom acts as an exit area. Thus, at least a portion of coolant passed through passage 50 will also be passed through branches 54 and then along the flow channel 90 associated with each insert B.

The rotary cutting tool shown and described above is particularly adapted to dynamic type (cutter rotating) machining applications. The preferred cutting tool structure shown is end milling or the like although the overall inventive concepts involved are deemed applicable to other types of material removal applications. In use, fluid coolant enters passage 50 from the inlet at main body end 12 and passes therethrough to exit axially from the outlet at main body end 14. Because of affects of cutting tool rotation, a portion of the coolant will be directed radially through branches 54 toward the insert receiving pockets in the tool body and then through the flow channel of each insert as defined by portions 94,98 and 96, respectively. In a typical milling operation where cutting tool body end 14 is closely adjacent the workpiece, coolant exiting axially from passage 50 at tool body end 14 will be radially deflected for flow toward the inserts along first cutting edges 70 and then, at some areas, axially of the tool body adjacent second cutting edges 72. Also, and since branches 54 and insert flow channels 90 comprise open grooves in the preferred arrangement, there will be some coolant flow outwardly therefrom. Nevertheless, coolant is advantageously supplied directly and indirectly to the inserts themselves and along the coolant flow channels included therein closely adjacent to and substantially coextensive with the insert cutting edges.

The above described coolant supply feature is particularly significant when the cutting tool is utilized for high feed rate machining of so-called high temperature or exotic alloys where the absence of such an intimate supply, increased insert wear and elevated cutting temperature characteristics would be present. These characteristics, in turn, necessitate more frequent tool changes in order to maintain acceptable machining conditions. Flow channel 90 in each insert accommodates coolant flow around the cutting edges and under the chips generated during a machining or material removal operation. This then provides a hydro-static coolant support of the chips to hold the chips away from the insert and thereby reduce the chip contact area therewith. The end result of such action is to effectively reduce the insert wear rate. Moreover, coolant supplied to inserts B in the manner described establishes a thermo-shield for reducing overall cutting temperatures.

By way of example, and with regard to high feed rate machining, e.g., on the order of magnitude of 50" per minute and higher, of high temperature or exotic alloys, the pressure of the coolant supplied to coolant passage 50 may approach 900 psi or so. Further, the coolant supply may advantageously be pulsed to obtain coolant surges at the inserts which aid in the support and flushing of chips generated during a material removal operation. Use of the subject new rotary cutting tool provides substantially improved cutting results for alloys which are more difficult to machine efficiently through a better utilization of coolant flow to the cutting inserts than has heretofore been possible by prior known rotary cutters. It should also be noted, however, that the subject tool may be readily employed in cutting more conventional materials using more conventional or normal coolant pressures and cutting parameters.

The subject invention has been described with reference to a preferred embodiment. It should be readily appreciated that many modifications to the tool may be made without in any way departing from the overall intent or scope of the invention. Merely by way of example only, the number of axial grooves included in cutting end portion 20 of the tool body may be varied from the four which are shown. Also, the specific configuration and/or interconnection of coolant passage 50 in the tool body for convenient operative association with a coolant supply may be varied as deemed necessary and/or appropriate. Further, the specific configuration of radial branches 54 may be varied as may the design and/or conformation of flow channel 90 in each of cutting inserts. Still further, and while a particular insert design has been shown and described above, other insert configurations, cutting edge relationships and the like may be used in practicing the invention.

It is intended to include the above exemplary alternatives as well as other modifications and alterations which will occur to others upon a reading and understanding of this specification insofar as they come within the scope of the appended claims or the equivalents thereof.

Having thus described the invention, it is now claimed:

1. A rotary cutting tool comprising:
an elongated generally cylindrical body having a longitudinal axis extending between first and second terminal body ends, a portion of said body adjacent said first end comprising a shank portion and a portion of said body adjacent said second end comprising a cutting portion;

at least one groove extending axially of said body along at least a section of said cutting portion to said second end and terminating in an insert receiving pocket;

a coolant flow passage in said body including an inlet in said shank portion and an outlet in said cutting portion, said flow passage being configured to permit at least some portion of a coolant passed therethrough to flow toward communication with said insert receiving pocket;

a cutting insert disposed in said receiving pocket having a first cutting edge having a length less than the radius of said body second end and extending radially of said body at a location axially outward of said second end, said first cutting edge extending from an innermost end disposed radially outward of said longitudinal axis to an outermost end disposed at least slightly beyond the radial outermost area of said body second end, said cutting insert including a distinct coolant flow groove in the outer face of said insert generally following the contour of said first cutting edge adjacent thereto and generally coextensive therewith, said flow groove having a distinct coolant entrance area in fluid communication with said body coolant flow passage outlet and a distinct coolant exit area spaced from said entrance area, whereby coolant introduced under pressure to said body coolant flow passage at said inlet during a material removal operation will pass therethrough and along said coolant flow groove for providing hydro-static chip support and a thermoshield for reducing cutting temperatures.

2. The cutting tool as defined in claim 1 wherein said cutting insert includes a second cutting edge extending generally axially of the side wall of said body cutting portion and spaced slightly radially outward therefrom with said first and second cutting edges merging at a corner area, said distinct coolant flow groove generally following the contour of said first and second cutting edges and said corner area adjacent thereto and generally coextensive therewith, said coolant flow groove exit area being disposed at the end of said second cutting edge spaced remote from said corner area.

3. The cutting tool as defined in claim 1 wherein said body coolant flow passage includes a main portion coaxial with said body and open at said body second end, said passage further including a branch portion extending generally radially of said body adjacent said second end in communication with said insert receiving pocket.

4. The cutting tool as defined in claim 3 wherein said branch portion comprises a radial groove in said second end.

5. The cutting tool as defined in claim 1 wherein said body includes a plurality of said grooves spaced apart from each other around said cutting portion, said grooves each terminating in an insert receiving pocket having a cutting insert disposed therein with each insert having at least a first cutting edge extending radially of said body, said coolant flow passage having a main portion and branches extending therefrom into communication with at least some of said insert receiving pockets, the inserts associated with said receiving pockets each including distinct coolant flow grooves therein.

6. The cutting tool as defined in claim 5 wherein said coolant flow passage main portion extends generally coaxial of said body and is open at said second end, said branches each extending generally radially of said body adjacent said second end in communication with an associated insert receiving pocket.

7. The cutting tool as defined in claim 6 wherein said branches comprise grooves in said second end.

8. The cutting tool as defined in claim 5 wherein each of said inserts includes a second cutting edge extending generally axially of the side wall of said cutting portion and spaced slightly radially outward therefrom with said first and second cutting edge communicating with each other at an insert corner area, the coolant flow grooves of those inserts associated with said at least some receiving pockets generally following the contour of said first and second cutting edges and said corner areas adjacent thereto and generally coextensive therewith, the flow channel exit areas being disposed at the ends of said second cutting edges spaced remote from said insert corner areas.

* * * * *